United States Patent [19]
Lee et al.

[11] Patent Number: 6,143,848
[45] Date of Patent: Nov. 7, 2000

[54] END-FUNCTIONALIZED POLYMERS BY CONTROLLED FREE-RADICAL POLYMERIZATION PROCESS AND POLYMERS MADE THEREFROM

[75] Inventors: Jinsong Lee, Akron; Paul Peter Nicholas, Broadview Heights; Naser Pourahmady, Solon; Rutger D. Puts, Cleveland Heights, all of Ohio

[73] Assignee: The B.F.Goodrich Company, Brecksville, Ohio

[21] Appl. No.: 08/956,571

[22] Filed: Oct. 23, 1997

[51] Int. Cl.$^7$ ........................................ C08F 2/00
[52] U.S. Cl. ............................ 526/212; 526/213
[58] Field of Search ..................... 526/212, 213

[56] References Cited

U.S. PATENT DOCUMENTS

| | | | |
|---|---|---|---|
| 4,055,713 | 10/1977 | Moczygemba et al. | 526/207 |
| 4,611,037 | 9/1986 | Musch et al. | 526/206 |
| 4,774,302 | 9/1988 | Harayoshi et al. | 526/206 |
| 5,248,746 | 9/1993 | Shimokawa et al. | 526/209 |
| 5,391,665 | 2/1995 | Matsunaga et al. | 526/211 |
| 5,455,319 | 10/1995 | Bak et al. | 526/206 |
| 5,627,248 | 5/1997 | Koster et al. | 526/217 |

FOREIGN PATENT DOCUMENTS

| | | |
|---|---|---|
| 0622378 | 11/1994 | European Pat. Off. . |
| 0722963 | 7/1996 | European Pat. Off. . |
| 3430518 | 2/1986 | Germany . |
| 19502086 | 7/1996 | Germany . |
| 4132706 | 5/1992 | Japan . |
| 4149207 | 5/1992 | Japan . |
| WO9603302 | 10/1996 | WIPO . |

OTHER PUBLICATIONS

Masayoshi Tatemoto, "Development of "Iodine Transfer Polymerization" and Its Applications to Telechlically Reactive Polymers", Kobunshi Ronbunshu, vol. 49, No. 10, pp. 765–783, 1992.

Macromolecules, Scott G. Gaynor et al., "Controlled Radical Polymerization by Degenerative Transfer: Effect of the Structure of the Transfer Agent", 1995, No. 28, pp. 8051–8056.

Brochure—Th. Goldschmidt AG, "α–ω–Polymethacrylate Diols A New Class of Linear Macrodiols", 1996.

Macromolecules Symposium, Eberhard Esselborn et al., "Block Copolymers and Telechelic Oligomers by End Group Reaction of Polymethacrylates", vol. 102, 1996, pp. 91–98.

Macromolecules, K. Matyjaszewski et al., "Controlled Radical Polymerizations: The Use of Alkyl Iodides in Degenerative Transfer", vol. 28, 1995, pp. 2093–2095.

*Primary Examiner*—Bernard Lipman
*Attorney, Agent, or Firm*—Thoburn T. Dunlap; George W. Moxon, II

[57] ABSTRACT

A controlled free-radical polymerization process for forming end-functionalized polymers is disclosed, particularly by degenerative iodine transfer. The end-functionalized polymers are characterized by a polydispersity less than 2.5 and a predetermined molecular weight. The end-functionalized polymers are useful as reactive intermediates in condensation polymerization, chain polymerization and heterogeneous polymerization reactions.

21 Claims, 12 Drawing Sheets

END-FUNCTIONALIZED POLYMERS BY CONTROLLED FREE-RADICAL POLYMERIZATION PROCESS AND POLYMERS MADE THEREFROM

BACKGROUND OF THE INVENTION

1. Field of the Invention

This invention relates to end-functionalized polymers, processes for making the same, and polymers made using such end-functionalized polymers. More particularly, the invention relates to a controlled free-radical polymerization process for forming end-functionalized polymers, particularly by a degenerative iodine transfer (DIT) and atom transfer radical polymerization (ATRP) processes. The resultant end-functionalized polymers have a high degree of functionality, a polydispersity less than 2.5, and a predetermined molecular weight. The resultant end-functionalized polymers are useful as reactive intermediates in condensation polymerization, chain polymerization and heterogeneous polymerization reactions.

2. Description of the Prior Art

Controlled free-radical polymerization processes, including ATRP and DIT, are prior art processes for free-radical polymerization. In degenerative iodine transfer polymerization, chain growth is controlled by iodine atoms, which reversibly react with the growing polymer chain ends thereby, limiting side reactions. Iodine atoms are introduced into the reaction using iodine transfer reagents, and polymer radicals are initially generated with a small amount of a conventional initiator.

The atom transfer radical polymerization process can also produce products with more uniform and more highly controlled architecture. The process includes free-radical polymerization of one or more monomers, in the presence of an initiator having a transferable atom or group, and a transition metal compound with an appropriate ligand. The transition metal compound has the formula $ML_n$, the ligand L being any N-,O-,P-, or S- containing compound, which can coordinate to the transition metal through a $\sigma$-bond or any carbon-containing compound which can coordinate through a $\pi$-bond, such that direct bonds between the transition metal in growing polymer radicals are not formed. The formed copolymer is then isolated.

Application of the degenerative transfer process in the production of polymers is disclosed in the following references: Japanese Kokai No. 4-132706 (1992), assigned to Nippon Shokubai, discloses a DIT process for the production of telechelic polymers having hydroxyl groups at the ends. The initial formula of the reagent used is X—R—X' wherein X is bromine or iodine and R is a bivalent C1–C8 hydrocarbon. The reagents used in the method are not efficient, and thus require a great excess of the iodo reagents (0.01–10 moles monomer per mol of the reagent) to produce polymers having a molecular weight of 1500 and greater. Further, the molar ratio of halide reagent to conventional initiator is extremely high, being on the order of 50 to 500 to 1. The functionalization process for converting the chain-end iodides to a hydroxyl group is also inefficient. In this regard, four reactions are specified: (1) hydrolysis; (2) substitution with diols; (3) substitution with hydroxy amines; and (4) substitution with carboxylates. Reactions 1 and 2 promote side reaction with ester containing polymers whereas reactions 3 and 4 are often slow and incomplete. The molecular weights obtained by the method disclosed in Nippon Shokubai Japanese Kokai No. 4-132706 are for the most part high, that is, in excess of 5000.

U.S. Pat. No. 5,439,980 issued in 1995 to Daikin Industries discloses a DIT process wherein block copolymers are synthesized using an iodine reagent and two monomers, which are added simultaneously. The process relies on large reactivity differences between the monomers, and introduces no functional endgroups.

U.S. Pat. No. 5,455,319 issued in 1995 to Geon describes the use of DIT to produce vinyl chloride homopolymers and some random copolymers of vinyl chloride. The iodine transfer reagents employed in the '319 patent are efficient in that they are activated reagents. But the DIT polymerization process in an aqueous media is described only for vinyl chloride polymers and the patent does not address end-functional polymers.

K. Matyjaszewsky, in *Macromolecules*, Vol. 28, pages 2093–2095 and 8051–8056 (1995) describes a process for controlled polymerization using iodine compounds. Neither efficient difunctional transfer agents nor reagents having an incorporated functional group are disclosed.

Atom transfer radical polymerization (ATRP), on the other hand, is also described in the prior art. For example, WO 96/304212 to Matyjaszewski and Carnegie-Mellon University describes metal catalyzed free-radical polymerization using an alkyl halide initiator to control the polymerization.

The general idea of using a functionalized initiator for ATRP or functionalizing the halide end group from an ATRP polymer is mentioned in J-S Wang, D. Grezsta, K. Matyjaszewski, *Polym. Mater. Sci. Eng.*, 73, 416 (1995). No examples are provided in the article, nor is it obvious how to carry out the hypothesis.

The synthesis of a polymer with an allyl end group using an allyl initiator or substitution with allyl trimethylsilane, and the synthesis of polystyrene with one amine end group using a trimethylsilyl azide reaction followed by hydrolysis are described in Y. Nakagawa, S. Gaynor, K. Matyjaszewaski, *Polym. Prep., Am. Chem. Soc.*, Polym. Div., 37(1), 577 (1996).

A polymer with a vinyl acetate group formed using a functionalized initiator is described in K. L. Beers, S. G. Gaynor, K. Matyjaszewski, *Polym. Prep., Am. Chem. Soc.*, Polym. Div., 37(1), 571 (1996).

Hydroxy end-functionalized polymers, and processes for making the same using non-living free-radical polymerizations, are also disclosed in prior art, European Patent No. EP 0622378A1 to Goldschmidt A G. This patent describes polymethacrylate diols and a process for making the same. The process is a conventional free-radical polymerization process initiated in the presence of a large amount of mercaptoethanol chain transfer agent. The polymer chain starts from mercaptoethanol and terminates with the methacrylate group, which is then converted to a hydroxyl containing moiety by a selective substitution reaction using an aliphatic diol in the presence of $Ti(OR)_4$. The chain end substitution reaction specified is a moisture-sensitive and costly process. Furthermore, the reaction is only selective and efficient for methyl methacrylate polymers thus limiting the general applicability.

U.S. Pat. No. 5,391,655 issued in 1995 to Nippon Shokubai describes a process wherein vinyl monomers are polymerized by conventional free-radical polymerization in the presence of a great excess of a disulfide reagent containing two hydroxyl groups at each end. The formula of the disulfide reagent is HO—R—S—S—R'—OH and the molar concentration of disulfide reagent is greater than 50 times that of the initiator and at least 0.5 of the vinyl monomer.

The process is flawed in that it cannot produce pure difunctional telechelics and in that large amounts of the functionalization reagents are needed.

Thus, there exists a need for a process capable of providing an end-functionalized polymers having a predictable molecular weight, high degree of functionality, and low polydispersity. The process must be sufficiently flexible to control molecular weight as well as polymer architecture. A living or controlled free-radical process followed by an efficient functionalization step provides a solution and is presented herein. Efficient iodine transfer agents or bromide initiators and inexpensive functionalization reagents are also needed.

The resultant end-functionalized polymers are useful as reactive intermediates for condensation polymerization of polyurethanes, polyesters and epoxides; chain polymerization to form graft copolymers and crosslinked copolymers; and polymeric emulsifiers.

BRIEF SUMMARY OF THE INVENTION

The present invention provides a process for controlled free-radical polymerization followed by chain-end conversion for making end-functionalized polymers. Such polymers are also generally referred to as telechelic polymers. They are also known as macromonomers in the specific case where the end groups are unsaturated and polymerizable. Degenerative iodine transfer and atom transfer radical polymerization are particular examples of controlled free-radical polymerization. The polymers produced by these methods have a predictable molecular weight, halogen end-groups, and low polydispersity. The process disclosed herein includes both efficient transfer agents as well as efficient and inexpensive reagents. The process also describes the conversion of halogen end-groups to desired functional groups, using efficient reagents. The resultant end-functionalized polymers are useful as reactive intermediates in condensation polymerization, chain polymerization and heterogeneous polymerization reactions.

In the first aspect of this invention, a process for forming a polymer having at least one functionalized end group is disclosed. The process involves heating a mixture of an iodine reagent having at least one iodine end group, a free-radical initiator, and at least one polymerizable monomer. The molar ratio of the free-radical initiator to the reagent is about 10 to 0.001. The molar ratio of the polymerizable monomer to the reagent is about 10 to 1,000. The iodine end group is converted to the functionalized end group by reaction with a nucleophilic reagent.

According to a second aspect of the invention, a mono-end-functional polymer is disclosed, which has the formula:

$$R\text{—polymer—}Y\text{—}R_2\text{—}Z_1 \quad (I)$$

where R contains at least one radical stabilizing group and has at least 1–50 carbon atoms, the polymer and the radical stabilizing group are attached to the same carbon atom in R, and the radical stabilizing group is selected from the group consisting of an aryl, alkene, ester, acid, amide, ketone, nitrile, halogen, isocyanate, nitro and amine.

where $R_2$ is a substituted or unsubstituted alkylidene group having 1–20 carbon atoms or is not present when $Z_1$ is directly bonded to the polymer, where Y is selected from the group consisting of oxygen, sulfur, and $N(R_5)$, where $R_5$ is hydrogen or a substituted or unsubstituted alkyl group or is not present when $Z_1$ is directly bonded to the polymer, and where $Z_1$ is selected from the group consisting of: $OR_1$, $N(R_1)_2$, $SR_1$, $COOR_1$, COOM, olefin of the type $-CR_1=C(R_1)_2$, epoxide of the type

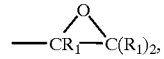

$SO_3M$, $PO(OR_1)_2$, $PO(R_1)_3$, $P(R_1)_3$, $-N=C=O$ and $-CR_1=O$, wherein $R_1$ is equal to H or a group having 1–20 carbon atoms, $R_1$ being the same or different for any $Z_1$ having more than one $R_1$, and wherein M is a metal ion.

The term "polymer" is used to define a molecular chain containing 5 to 500 monomer units, including mono- or disubstituted vinylic units, such as $-[-CH(R_6)-C(R_4)(X)-]-$ where $R_4$ is selected from hydrogen, methyl, hydroxymethyl, phenyl, halogen, or $CH_2COOH$, X is selected from the group consisting of an alkyl, aryl, nitrile, halide, alcohol, carboxyl, sulfonyl, ester of the type $-CO-O-R_3$, acetate of the type $-O-CO-R_3$, ether of the type $-O-R_3$, carboxyamide of the type $-CO-N(R_3)_2$ and amine of the type $N(R_3)_2$, wherein $R_3$ is equal to H or a group having 1–30 carbon atoms, $R_3$ being the same or different for any X having more than one $R_3$, where $R_6$ is selected from hydrogen, methyl, phenyl, halogen, or $CH_2COOH$, alkyl, aryl, nitrile, halide, alcohol, carboxyl, sulfonyl, ester of the type $-CO-O-R_3$, acetate of the type $-O-CO-R_3$, ether of the type $-O-R_3$, carboxyamide of the type $-CO-N(R_3)_2$ and amine of the type $N(R_3)_2$, or diene monomer units. The polymer chain may be composed of a series of one monomer or a random mixture of two or more of these monomers. In addition, the chain may have a non-random distribution of the monomers, such as when the distributions are a diblock, triblock, multi-block, or graft structures. The polymer is formed in the DIT or ATRP process and is preferably poly (n-butyl acrylate), polystyrene, poly(ethyl acrylate), poly(ethylhexyl acrylate), or poly(acrylonitrile-co-n-butyl acrylate).

According to a third aspect of the invention, a bis-end-functional polymer is disclosed, which has the formula:

$$Z_2\text{—}R\text{—polymer—}Y\text{—}R_2\text{—}Z_1 \quad (II)$$

where R, Y, $R_2$, and $Z_1$ are as previously noted, $Z_2$ is selected from the same group as $Z_1$, and $Z_1$ and $Z_2$ are independently selected.

According to a fourth aspect of the invention, a bis end-functional polymer is disclosed, which has the formula:

$$Z_1\text{—}R_2\text{—}Y\text{—polymer—}R\text{—polymer—}Y\text{—}R_2\text{—}Z_1 \quad (III)$$

where R, Y, $R_2$, and $Z_2$ are selected as previously noted.

According to the fifth aspect of the invention, ATRP can be used to form a prepolymer with bromide or chloride end groups, which can be functionalized by conversion of end group by reaction with a nucleophilic reagent.

One advantage of the present invention is that the degenerative iodine transfer process disclosed employs efficient chain transfer agents.

Another advantage of the present invention is that the degenerative iodine transfer process disclosed provides both molecular weight and polymer architecture control.

Still another advantage of the present invention is that a degenerative iodine transfer process is disclosed wherein inexpensive iodine reagents, in amounts much less than those specified in the prior art, are disclosed.

Another advantage of the present invention is that a degenerative iodine transfer process disclosed is effective with a wide variety of monomers—that is, more than fluorinated monomers, can be used in the practice of the DIT process.

Still another advantage of the process disclosed is the efficient end-group conversion applied to polymers prepared by ATRP.

Another advantage is that the resulting end-functionalized polymers, or telechelic polymers, can be used in a condensation, radical, anionic, or graft polymerization processes.

Still another advantage is that using the described process a wide variety of monomers can be used.

Another advantage is that a wide variety of functional end groups can be introduced with the appropriate choice of nucleophilic reagents.

Still another advantage is that the iodine can be recycled in the described process.

Another advantage is that the efficient iodine transfer reagents can contain one functional group and only one iodine which lowers the amount of iodine used in the process compared to bis iodine reagents.

Still another advantage is that polyacrylate diol polymers can be made which improve properties and give higher hydrolytic and UV stability when incorporated in polyurethanes, polyesters, polyamides, polycarbonates, and polyepoxides.

Another advantage is that olefinic end-functional polymers, also known as macromonomers, can be produced which can be used to prepare graft copolymers in chain polymerization to form block and graft copolymers.

Still another advantage is that polymers can be formed with ionic end groups, useful as polymeric surfactants.

Another advantage is that polymers can be formed with two different functional end groups.

Still another advantage is that end-functional diblock or triblock copolymers can be made.

Still other benefits and advantages of the invention will become apparent to those skilled in the art upon reading and understanding of the following detailed specification.

DETAILED DESCRIPTION OF THE PREFERRED EMBODIMENT

The present invention relates to end-functionalized polymers by a controlled free-radical polymerization process, followed by chain-end conversion. More particularly, the invention relates to the formation of monofunctional and difunctional polymers, including telechelic polymers, and macromonomers. The controlled free-radical polymerization processes are degenerative iodine transfer (DIT) and atom transfer radical polymerization (ATRP).

Figure 1:
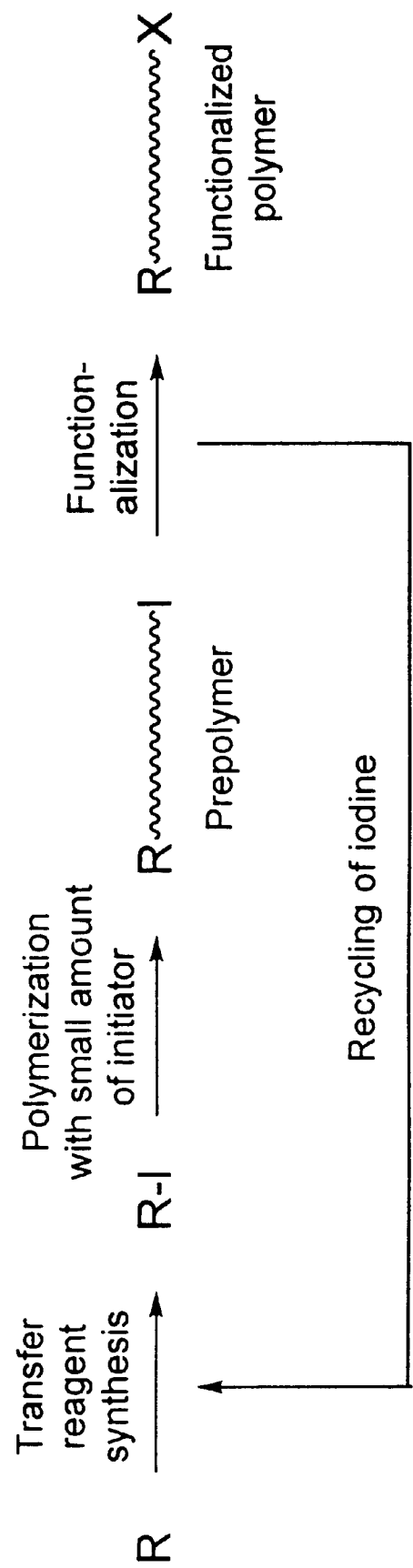
FIG. 1 is a schematic view of the DIT process and functionalization utilized in practicing the subject invention.
Figure 2:
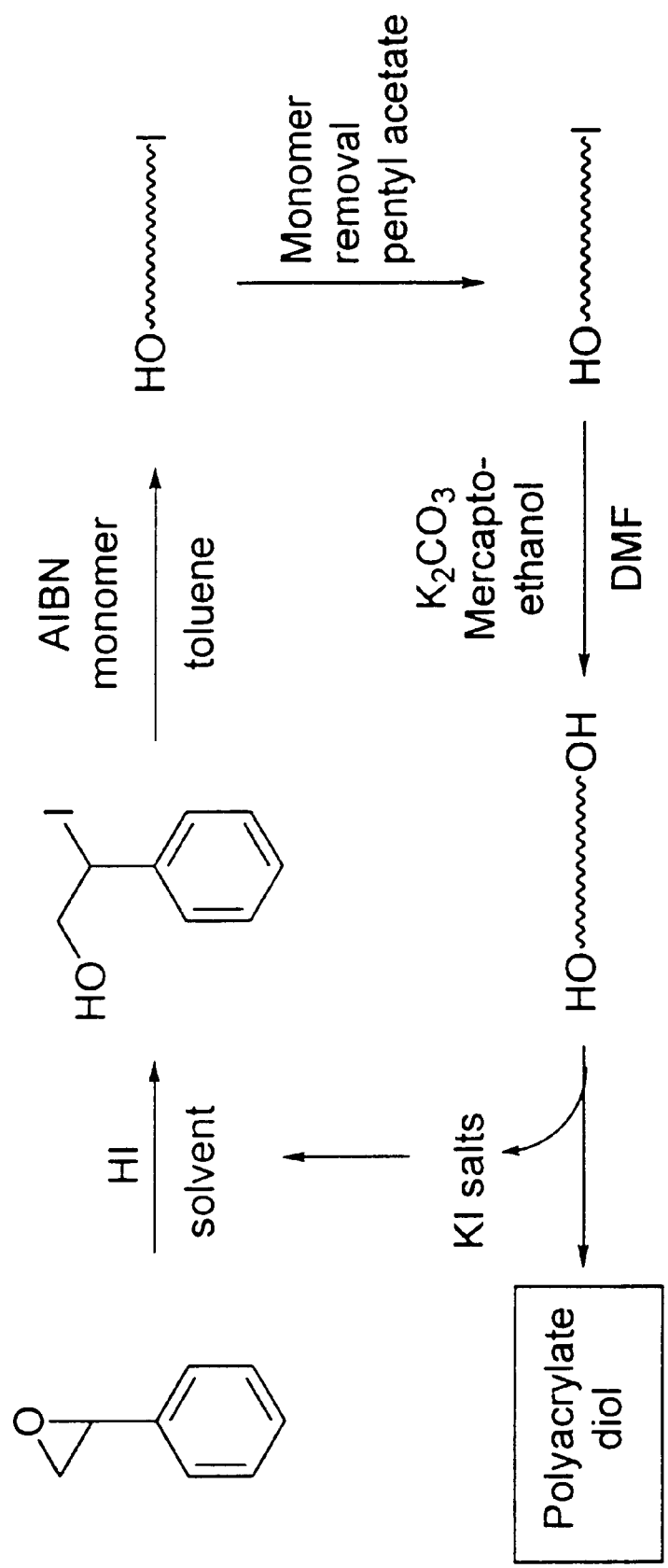
FIG. 2 is a schematic view illustrating the synthesis of polymer diols by the DIT process utilized in practicing the subject invention.
Figure 3A:
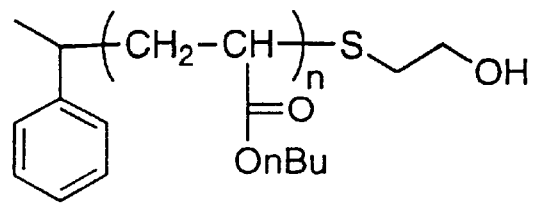
FIG. 3 illustrates examples of Type I mono-functional polymers of the subject invention.
Figure 3B:
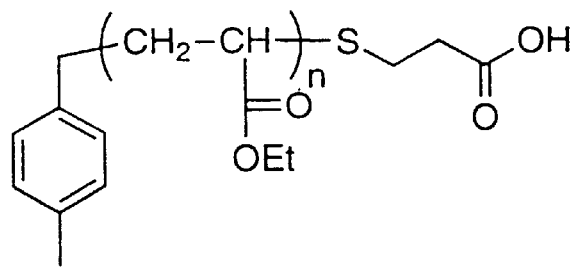
Figure 3C:
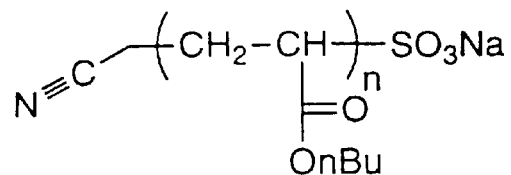
Figure 3D:
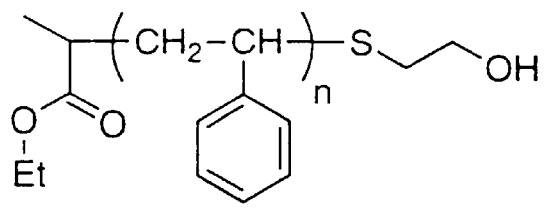
Figure 3E:
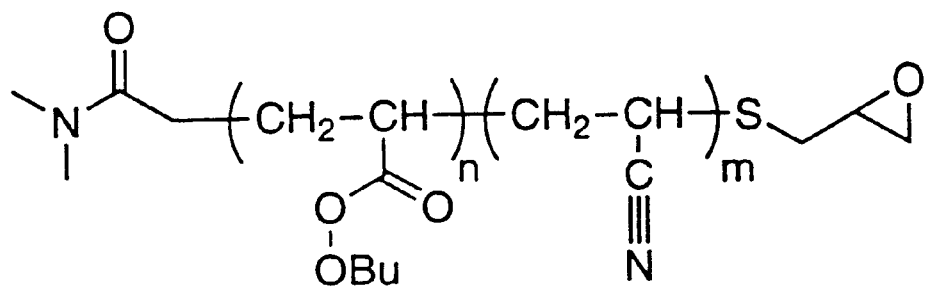
Figure 3F:
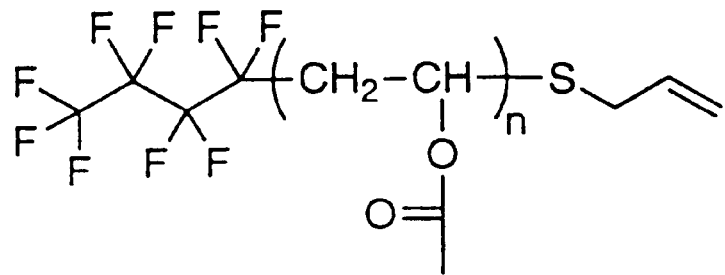
Figure 3G:
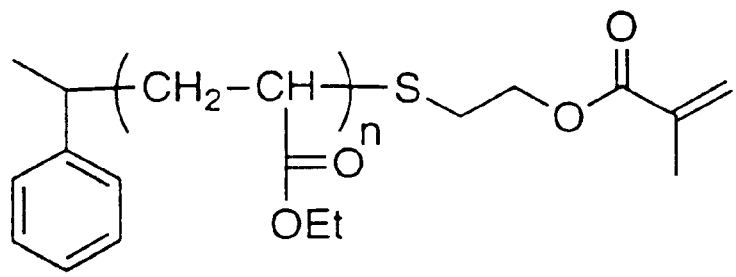
Figure 4A:
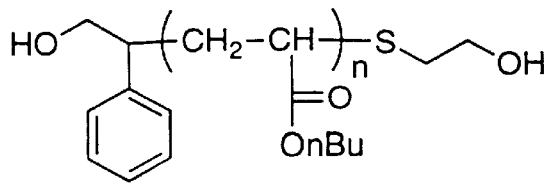
FIG. 4 illustrates examples of Type I difunctional polymers of the subject invention.
Figure 4B:
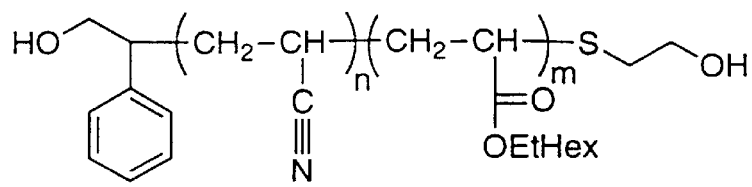
Figure 4C:
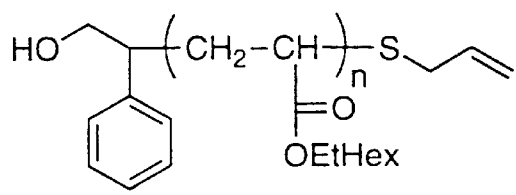
Figure 4D:
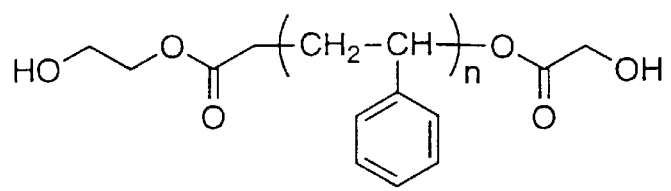
Figure 4E:
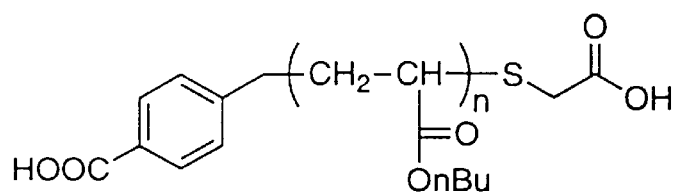
Figure 4F:
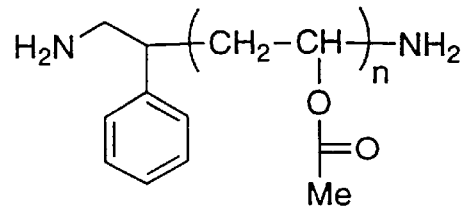
Figure 4G:
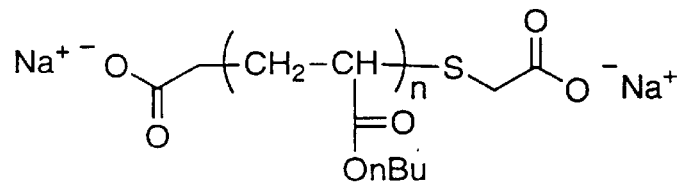
Figure 4H:
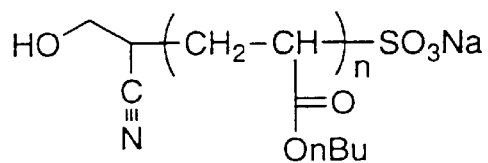
Figure 4I:
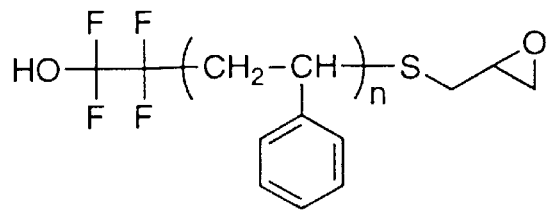
Figure 4J:
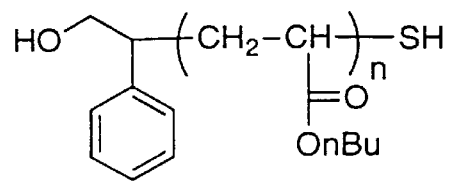
Figure 5A:
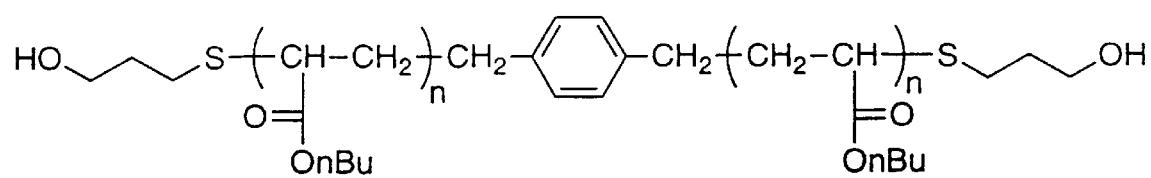
FIG. 5 illustrates examples of Type II functionalized polymers of the subject invention.
Figure 5B:
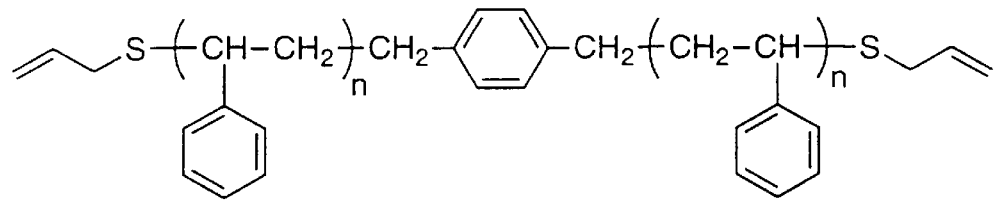
Figure 5C:
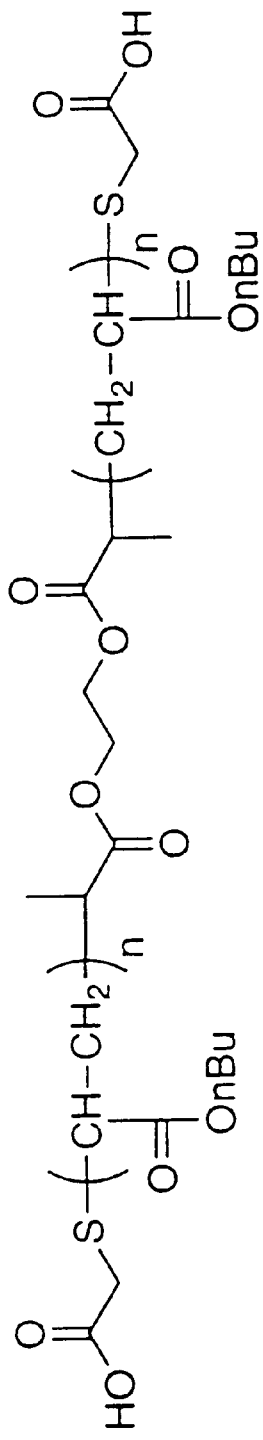
Figure 5D:
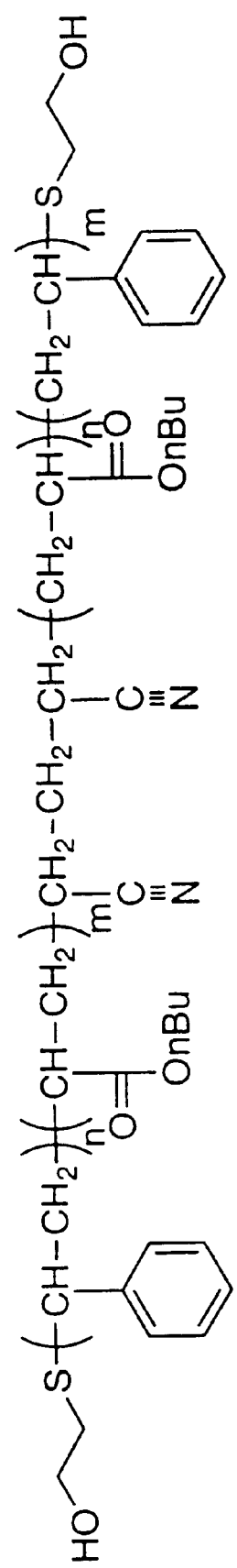

The DIT process of the present invention is used to form prepolymers with one or more iodine end groups. These iodine end groups are converted in a second step to the desired functional groups. The process is illustrated generally in FIG. 1 and involves heating a mixture of an activated iodine reagent having at least one iodine end group, a free-radical initiator, and at least one polymerizable monomer. The process is illustrated for the production of one specific class of polymer diols in FIG. 2.

The iodine reagents of the subject DIT process all contain one or more radical stabilizing groups, attached to the carbon(s) adjacent to the iodine atoms. This group activates the reagents towards iodine transfer and makes the reagents efficient.

The iodine reagents to be distinguished in particular are: (1) mono-iodine reagents without a functional group, R—I; (2) mono-iodine reagents with a functional group, $Z_2$—R—I; and (3) di-iodine reagents, I—R—I.

Reagents of the type R—I can be used to make monofunctional polymers, reagents of the type $Z_2$—R—I and I—R—I can be used to make difunctional polymers with functional groups at both ends of the polymer. The distinction between $Z_2$—R—I and I—R—I is that the former reagent can be used to make difunctional polymers with two different end groups, while the latter reagent can only lead to di-functional polymers with two identical end groups.

The mono-iodine reagents without a functional group are of the formula:

R—I    (IV)

where R contains at least one radical stabilizing group and has 1–50 carbon atoms, the polymer and the radical stabilizing group are attached to the same carbon atom in R, and the radical stabilizing group can be an aryl, alkene, ester, acid, amide, ketone, nitrile, halogen, isocyanate, nitro and amine. Examples of the radical stabilizating group include $C_6H_4Me$, $OC(=O)$—Me, F, and CN. Preferred R—I reagents are depicted below:

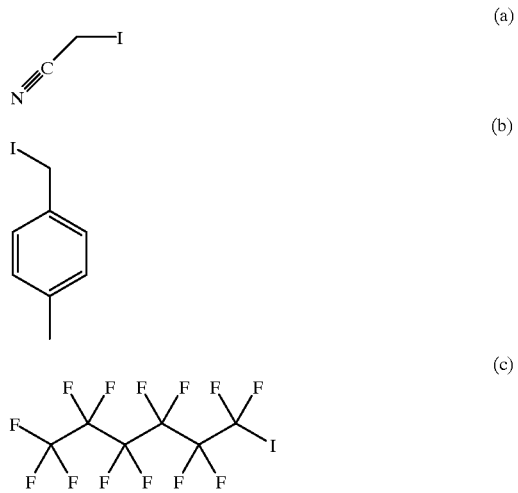

-continued

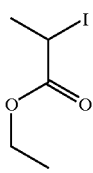
(d)

The mono-iodine reagents with a functional group are of the formula:

 (V)

where R, as noted above, contains at least one radical stabilizing group and has 1–50 carbon atoms, the polymer and the radical stabilizing group are attached to the same carbon atom in R, and the radical stabilizing group is selected from the group consisting of an aryl, alkene, ester, acid, amide, ketone, nitrile, halogen, isocyanate, nitro and amine, and where $Z_2$ is selected from the group consisting of: $OR_1$, $N(R_1)_2$, $SR_1$, $COOR_1$, COOM, olefin of the type $—CR_1=C(R_1)_2$, epoxide of the type

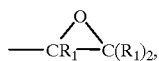

$SO_3M$, $PO(OR_1)_2$, $PO(R_1)_3$, $P(R_1)_3$, $—N=C=O$ and $—CR_1=O$, wherein $R_1$ is equal to H or a group having 1–20 carbon atoms, $R_1$ being the same or different for any $Z_2$ having more than one $R_1$, and wherein M is a metal ion.

Preferred reagents of the type $Z_2$—R—I are depicted below:

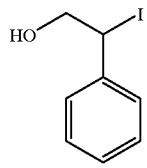
(e)

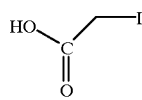
(f)

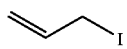
(g)

The di-iodine reagents without a functional group are of the formula:

 (VI)

where R, as previously noted, contains at least one radical stabilizing group and has 1–50 carbon atoms, the polymer and the radical stabilizing group are attached to the same carbon atom in R, and the radical stabilizing group is selected from the group consisting of an aryl, alkene, ester, acid, amide, ketone, nitrile, halogen, isocyanate, nitro and amine.

Preferred reagents of the type I—R—I are depicted below:

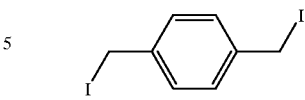
(h)

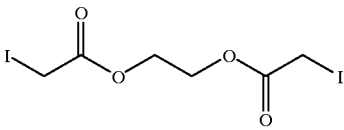
(i)

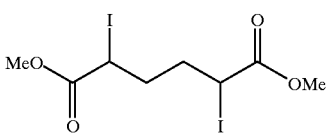
(j)

The iodine reagent selected for the polymerization is dependent on the type of monomer and the architecture desired. A balance between the rate of transfer and rate of reinitiation needs to be maintained. For example, 1-iodo-1-phenylethanol is a suitable reagent for the polymerization of styrene and n-butyl acrylate. But it does not work properly for the polymerization of vinylacetate or vinylidene chloride because the radical formed after transfer is not reactive enough for reinitiation. To the contrary, methylene iodide does not transfer quickly enough to provide controlled (polymerization occurs—but uncontrolled) polymerization of styrene or n-butyl acrylate. For the polymerization of vinyl acetate, perfluorohexyliodide is used instead of 1-iodo-1-phenylethanol.

The suitable free-radical initiators useful in the practice of the present invention include any conventional free-radical initiators known in the art. These initiators can include hydroperoxides, peresters, percarbonates, peroxides, persulfates and azo initiators. Specific examples of some initiators include hydrogen peroxide, tertiary-amyl peroxide, dibenzoyl peroxide (BPO), potassium persulfate, and methylethyl pentyl peroxide.

In the preferred embodiment, the free-radical initiators are azo-initiators such as azobisisobutyronitrile (AIBN), azobiscyanovaleric acid (ADVA), azobis (hydroxyethylcyanovaleramide) (VA-080), azobis (cyclohexanecarbonitrile), 2.2' azobis (4-methoxy-2,4-dimethylvaleronitrile), 2.2'-azobis[2-methyl-N-(2-hydroxyethyl)propionamide]. Preferably, the molar ratio of the free-radical initiator to the reagent is 10 to 0.001, with 2 to 0.01 being preferred. The described initiators may optionally contain the same functional group as $Z_1$ to increase the functionality of the final polymer.

Suitable monomers for use in the present invention include: $C_3$–$C_6$ monoethylenically unsaturated carboxylic acids, and the alkaline metal and ammonium salts thereof. The $C_3$–$C_6$ monoethylenically unsaturated carboxylic acids include acrylic acid, methacrylic acid, crotonic acid, vinyl acetic acid, maleic acid, fumaric acid, and itaconic acid. Acrylic acid and methacrylic acid are the preferred monoethylenically unsaturated carboxylic acid monomers.

The acid monomers useful in this invention may be in their acid forms or in the form of the alkaline metal or ammonium salts of the acid. Suitable bases useful for neutralizing the monomer acids includes sodium hydroxide, ammonium hydroxide, potassium hydroxide, and the like. The acid monomers may be neutralized to a level of from 0 to 50% and preferably from 0 to about 20%.

Monoethylenically unsaturated monomers containing no carboxylic acid groups are also suitable in the present invention. Typical examples include alkyl esters of acrylic or methacrylic acids such as methyl acrylate, ethyl acrylate, butyl acrylate; hydroxyalkyl esters of acrylic or methacrylic acid such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethyl acrylamide; acrylonitrile, methacrylonitrile, dimethylaminoethyl acrylate, dimethylaminoethyl methacrylate, phosphoethyl methacrylate, N-vinyl pyrrolidone, N-vinylformamide, N-vinylimidazole, vinyl acetate, styrene, maleimide, hydroxylated styrene, styrenesulfonic acid and salts thereof, vinylsulfonic acid and salts thereof, and 2-acrylamido-2-methylpropanesulfonic acid and salts thereof. Other monomers include halogenated vinylic monomers such as vinyl chloride, vinylidene chloride, and vinylidene fluoride.

Other suitable monomers include acrylamides, alkyl and aryl amide derivatives thereof, and quaternized alkyl and aryl acrylamide derivatives and dienes such as butadiene and isoprene.

The molar ratio of the polymerizable monomer to the iodine reagent is about 10 to 1,000, with 15 to 50 being preferred. In the preferred embodiment, the polymerizable monomers are n-alkyl acrylates, acrylic acid, styrene, and acrylonitrile.

The monomers can be added pure or as combinations of monomers to form copolymers. Because of the living polymerization character, different monomers can also be added sequentially, eventually leading to functionalized block copolymers.

These monomers will result in a polymer having a "polymer" backbone comprising 5 to 500 monomers units, including vinylic monomer units or disubstituted vinylic units, such as —[—CH($R_6$)—C($R_4$)(x)—]— where $R_4$ is selected from hydrogen, methyl, phenyl, halogen, or $CH_2COOH$, X is selected from the group consisting of an alkyl, aryl, nitrile, halide, alcohol, carboxyl, sulfonyl, ester of the type —CO—O—$R_3$, acetate of the type —O—CO—$R_3$, ether of the type —O—$R_3$, carboxyamide of the type —CO—N($R_3$)$_2$ and amine of the type N($R_3$)$_2$, wherein $R_3$ is equal to H or a group having at least 1–30 carbon atoms, $R_3$ being the same or different for any X having more than one $R_3$, where $R_6$ is selected from hydrogen, methyl, phenyl, halogen, or $CH_2COOH$, alkyl, aryl, nitrile, halide, alcohol, carboxyl, sulfonyl, ester of the type —CO—O—$R_3$, acetate of the type —O—CO—$R_3$, ether of the type —O—$R_3$, carboxyamide of the type —CO—N($R_3$)$_2$ and amine of the type N($R_3$)$_2$, or diene monomer units. The polymer chain may be composed of one monomer or a random mixture of two or more of these monomers. In addition, the chain may have a non-random distribution of the monomers, such as when the distributions are a diblock, triblock, multi-block, or graft structure. The polymer is formed in the DIT or ATRP process. The "polymer" is preferably a poly (n-butyl acrylate), polystyrene, poly(ethyl acrylate), poly(ethylhexyl acrylate), or poly(acrylonitrile-co-n-butyl acrylate).

The polymerization step is preferably conducted in the presence of a solvent or co-solvent. Examples of solvent or co-solvents useful in the present invention include compatible hydrocarbons, aliphatic alcohols, glycols, ethers, glycol ethers, pyrrolidones, N-alkyl pyrrolidones, polyethylene glycols, polypropylene glycols, amides, carboxylic acids and salts thereof, esters, carbonates, organosulfides, sulfoxides, sulfones, alcohol derivatives, hydroxyether derivatives such as CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof in a 50% by weight solution. The most suitable solvents include toluene, amyl acetate, butyl acetate, pseudocumene, dimethylformamide and tetrahydrofuran. The most preferred solvent for the polymerization step is toluene. However, the polymerization step can be conducted in bulk.

The polymerization step is carried out at 0–150° C., preferably at from 40–80° C.

The resultant prepolymer is functionalized by reaction with a nucleophilic reagent and a weak base. Suitable nucleophilic reagents for practice in the present invention include thiols, amines, alcohols, sulfites, and phosphines. The nucleophilic reagent has the general formula:

$$Z_1-R_2-YH \qquad (VII)$$

where Y, $Z_1$, and $R_2$ are selected as previously noted.

The preferred reagents are:

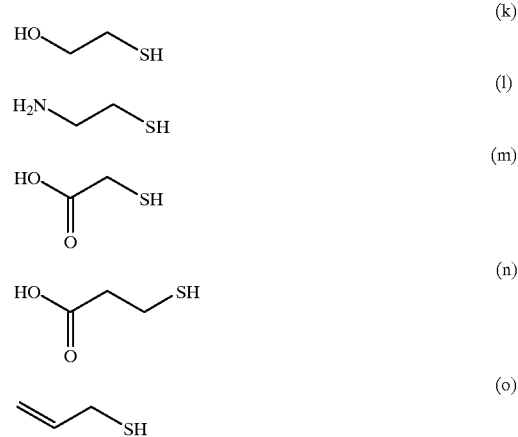

The nucleophilic reagents are preferably used in a 1:1 ratio with respect to iodine end groups. In the preferred embodiment, suitable nucleophilic reagents include mercaptoethanol, mercaptopropanol, allyl mercaptan, thioacetic acid, mercaptopropionic acid.

Suitable bases for use in the functionalization step include ZnO, pyridine, 4-dimethylaminopyridine (DMAP), diazabicyclo[5,4,0] undec-7-ene (DBU), $K_2CO_3$, $K_3PO_4$, $NaHCO_3$, basic alumina, $Et_3N$, CaO, and 1,4-diazabicyclo[2,2,2]octane (DABCO). In the preferred embodiment, the base used is $K_2CO_3$.

The functionalization step can also be conducted in the presence of a solvent or co-solvent. Examples of solvents or co-solvents useful in the present invention include compatible alkanes, arenes, aliphatic alcohols, glycols, ethers, glycol ethers, pyrrolidones, N-alkyl pyrrolidones, polyethylene glycols, polypropylene glycols, amides, carboxylic acids and salts thereof, esters, carbonates, organosulfides, sulfoxides, sulfones, alcohol derivatives, hydroxyether derivatives such as CARBITOL® or CELLOSOLVE®, amino alcohols, ketones, and the like, derivatives thereof, and mixtures thereof. Specific examples include ethylene glycol, propylene glycol, diethylene glycol, glycerine, tetrahydrofuran, and the like, and mixtures thereof. The most suitable solvents include toluene, amyl acetate, butyl acetate, pseudocumene, N,N-dimethyformamide (DMF) and tetrahydrofuran (THF). The preferred solvent for the functionalized step is DMF.

The functionalization step can be carried out at a temperature range of −50° C. to 100° C. In the preferred embodiment, the temperature range of the functionalization step is from −10° C. to 70° C.

In the preferred embodiment, iodine-containing salts generated as a by-product of the functionalization step are recycled for use in the transfer reagent synthesis. The addition of base does not only facilitate substitution, it also serves to neutralize any hydriodic acid that is formed. The resulting iodide salts can be separated from the polymer/solvent mixture using conventional methods. The hydriodic acid can be recovered from the iodide salts or those salts can be used directly in the synthesis of the iodine reagents. This process results in an additional significant cost reduction of the overall functionalization process.

Preferably, prepolymers made by the DIT process disclosed herein are functionalized using the functionalization process disclosed herein. We have discovered that our functionalization process is advantageous in that the reagents are mild and minimize side reactions with the polymer backbone or end groups. Furthermore, the reagents are cost efficient and lead to very high degrees of functionalities. Yet, another advantage is that the functionalization process can be carried out such that iodine can be recycled.

The resultant end-functionalized polymers formed by the disclosed DIT process and functionalized in accordance with the process disclosed herein are of three types: Type I where only one end of the chain contains a reactive functional group; Type II where both ends of the polymer chain contain reactive functional groups, which can be the same or different, and Type III where both ends of the polymer chain carry identical functional groups. In either event, the polymer between the end groups can be random, di-, tri- or multiblock, graft or star shaped, or gradient copolymers. The end-functionalized polymers have a polydispersity less than 2.5.

The Type I end-functionalized polymers may contain reactive functionalities such as a hydroxyl, amine, carboxyl, epoxy, isocyanate, and the like. The molecular weight of these polymers can range anywhere from 500 to 20,000 Daltons. They are preferably used to introduce grafts into polymers that contain a reactive pendant group on their backbone. The low-molecular weight versions of the Type I polymers are also useful as a polymeric emulsifiers and co-surfactants.

The reactive functionality in the Type I polymers could also be a polymerizable vinyl group where X in the previously described formula is an acrylic, methacrylic, vinyl benzene, vinyl ester, etc. In this case, the end-functionalized polymer is a macromonomer. These macromonomers are useful in polymerization with a variety of monomers to create side-chain block or graft copolymers.

The Type I end-functionalized polymers can be of the formula:

R—polymer—Y—R$_2$—Z$_1$ (I)

where R, Y, R$_2$, Z$_1$, and "polymer" are selected as previously noted.

The Type II end-functionalized polymers are of the formula:

Z$_2$—R—polymer—Y—R$_2$—Z$_1$ (II)

where R, Y, R$_2$, Z$_1$, Z$_2$, and "polymer" are selected as previously noted.

The Type III end-functionalized polymers are of the formula:

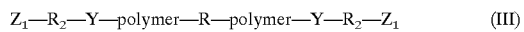

Z$_1$—R$_2$—Y—polymer—R—polymer—Y—R$_2$—Z$_1$ (III)

where R, Y, R$_2$, Z$_1$, and "polymer" are selected as previously noted.

Specific examples of the Type I end-functionalized polymers of the instant invention are illustrated in FIG. 3. FIG. 4 illustrates the difunctional Type II polymers. FIG. 5, on the other hand, is illustrative of the Type III difunctional polymers.

Figure 6:
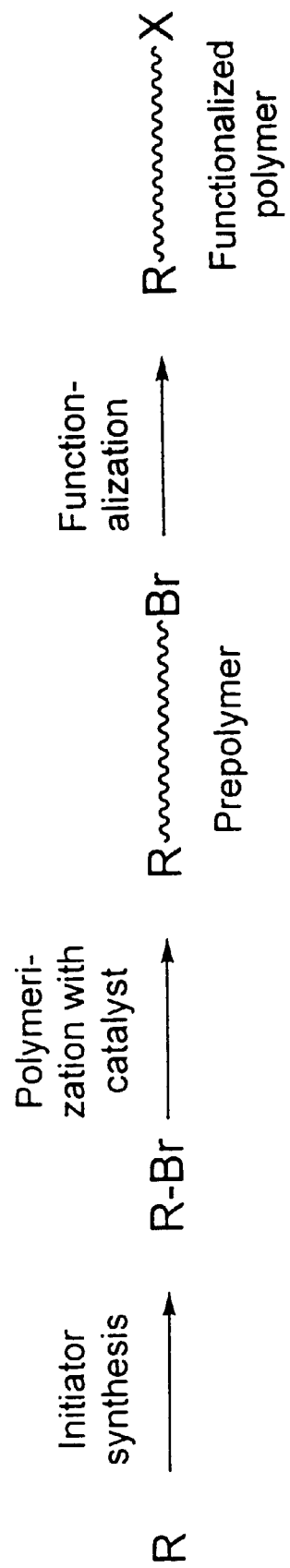
FIG. 6 is a schematic view of the ATRP process and functionalization utilized in practicing the subject invention.

End functionalization in accordance with the present invention can also be used for polymers produced by an atom transfer radical polymerization (ATRP) process as illustrated in FIG. 6. The ATRP process is disclosed in WO 96/30421 and is incorporated herein by reference. ATRP polymers differ from DIT polymers in that bromide or chloride terminated prepolymers are formed in ATRP, versus the iodide terminated prepolymers in DIT polymerization. The preferred nucleophilic reagents that can be used to efficiently functionalize prepolymer made by ATRP are sulfur reagents of the formula:

Z$_1$—R$_2$—SH (VIII)

where R, Y, R$_2$, and Z$_1$ are selected as previously noted.

These reagents give selective substitution with polyacrylates having bromide end groups without interchanging on the ester groups in the backbone of the polymer. The latter side reaction is the dominant one if any other reagent is used to introduce the claimed end groups on an acrylate polymer. Examples of the reagents are:

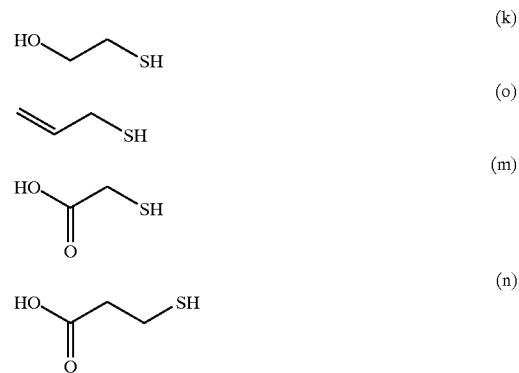

The uses for the end-functionalized, telechelic polymers of the present invention include the use of the monofunctional polymer (Type I) containing reactive functionalities, such as hydroxyl, amine, carboxyl, epoxy, isocyanate, or the like, as grafting reagents for reacting with polymers containing a reactive pendant group on their backbone. Molecular weights of the end-functionalized polymers could range between 500 to 20,000. The low-molecular weight versions of these polymers could also be useful as polymeric emulsifiers and as co-surfactants. The Type I polymers, having, for example, a polymerizable vinyl end group, could be used in copolymerization with a variety of monomers to create side-chain block or graft copolymers.

The Type II and Type III difunctional polymers have two reactive end groups such as a hydroxyl, amine, carboxyl, epoxy, isocyanate, etc. The end groups can be different (Type II) or the same (Type III). As such, they have various applications in the polymer industry, including the following:

As chain-extenders in the manufacture of polyesters, polyurethanes, polyamides, polycarbonates, and epoxy resins.

As liquid reactive polymers useful as crosslinkers and impact modifiers in polyesters and epoxy resins.

In the manufacture of water-borne polyurethanes and alkyd resins.

As tackifier, adhesion promoters and compatibilizers in polymeric blends.

In the synthesis of thermoplastic elastomers, block copolymers, and polymer network.

As low melt-flow, reactive polymers, useful for crosslinkable powder coating compounds.

Other industrial applications for difunctional polymers having hydroxyl groups at both terminals are described in U.S. Pat. No. 5,391,665, which is incorporated herein by reference.

The Type II and III polymers having polymerizable groups, e.g., vinyl groups, at both ends could be used to manufacture cross-linked polymeric emulsions and dry resin products, or in UV-cure, solvent-based coatings, powder coatings, and high-temperature cure adhesive/binder materials.

The end-functionalized or telechelic polymers of the present invention, especially when they are macromonomers, can be employed in further, conventional polymerization processes, including condensation polymerization, radical polymerization, anionic polymerization, and graft polymerization, to make polyurethanes, polyesters, polyamides, polycarbonates, and polyepoxides having improved properties. These properties are derived from the fact that the process of the present invention allows for control of the molecular weight of the polymer, targeting a molecular weight of the polymer, producing block polymers, and using a wide variety of monomers to make improved polymers. As is seen in Example 23, a polyurethane made using end-functionalized acrylated polymer of the present invention has improved hydrolytic stability (as shown in Table II). Further, the polyurethane polymer will provide improved ultraviolet light stability due to the fact that the polymer can be made using an end-functionalized polyacrylate.

TABLE II

| Media of Exposure | Diol Component of Polyurethane | | | | |
|---|---|---|---|---|---|
| | Polyester | Polyether | Poly (THF) | Poly MMA | Poly (nBA) |
| % MW (Control) | 100 | 100 | 100 | 100 | 100 |
| % MW after exposure to Water | 49 | 94 | 92 | 67 | 92 |
| % MW after exposure to 10% KOH | <1 | 59 | 45 | 21 | 83 |

The present invention will now be described in greater detail in the following non-limiting examples. In these examples, the abbreviation PIE stands for 1-iodo-1-phenylethanol and DIX stands for α,α'-diiodoxylene. MALDI Analyses are matrix assisted laser desorption—time of flight mass spectroscopic analyses using indole acrylic acid as the matrix.

EXAMPLE 1

Synthesis of 2-iodo-2-phenylethanol (PIE) in an Aqueous Solvent

2-Iodo-2-phenylethanol was synthesized as described in Golumbic, C. and Cottle, D. L. *J. Am. Chem. Soc.* 61, 996 (1939). An aqueous HI solution (81.7 grams, 54.7%) and 556 ml of water were added to a 1L reaction flask equipped with an addition funnel, which was cooled to zero degrees C. Styrene oxide (40 grams) and 50 grams of ethanol were added to the addition funnel. The styrene oxide solution was added dropwise to the flask over a 40-minute period during which a white precipitate was formed. Filtration over a fritted glass funnel followed by drying under vacuum for four hours yielded 69.8 grams of a white solid having a melting point of 62–66° C. The solid was dissolved in 560 ml of ethanol and poured into rapidly stirred water (2.5L containing 100 ml of 5% NaHSO$_3$). The white precipitate was collected on a fritted glass funnel and dried in a vacuum oven at room temperature for four hours in the presence of P$_2$O$_5$ as a desiccant. The white solid (24 grams) had a melting point of 75.5–76° C. NMR analysis was consistent with the reports in the above-cited literature.

EXAMPLE 2

Synthesis of 2-iodo-2-phenylethanol (PIE) in an Organic Solvent

A 250 ml round bottom flask was charged with 21 ml HI (55% aqueous solution) and cooled to 0° C. Via an addition funnel, 20 grams of styrene oxide in 80 ml of diethylether were added over a one hour period. Diethylether (45 ml) was added and the water phase was separated. The leftover organic solution was dried with Na$_2$SO$_4$ and evaporated. Thirty-eight grams of a faint yellow solid were obtained having a melting point of 71–72° C.

EXAMPLE 3

Synthesis of diiodoxylene (DIX)

DIX was synthesized as reported in Finkelstein, *Chem. Ber.*, 43, 1532 (1910). A solution of 5.04 grams of sodium iodide in 24 ml of acetone was added to a stirred solution of 3.69 grams of α, α'-dibromo-p-xylene in 90 ml of acetone in a 500 ml round bottom flask under argon. A solid precipitated, and stirring was continued for 30 minutes. Water (250 ml) was added to the mixture to dissolve the salts. The mixture was then vacuum filtered, washed with water several times, and vacuum dried at room temperature overnight. The observed melting point was 175–178° C.

EXAMPLE 4

Synthesis of 2-iodo-2-phenylethanol from Mixed Calcium Salts

A mixture of CaI$_2$ and Ca(OH)$_2$ (6 grams and 1.6 grams, respectively) was placed in a 100 round bottom flask and 100 ml of water were added. HI was generated by adding 2.4 ml of concentrated H$_2$SO$_4$ and the reaction mixture was cooled to 0° C. and 5 ml of ether were added. Via an addition funnel, styrene oxide (5 grams) in 10 ml of diethylether were added dropwise over a 35-minute period, followed by 15 ml of ether. The organic layer was separated out and the water layer was washed with 10 ml ether. The combined ether solutions were washed with 10 ml 10% NaHSO$_3$ and dried over Na$_2$SO$_4$. Evaporation yielded 7.9 grams of a light yellow powder with a melting point from 64–67° C. NMR analysis was consistent with the reports in the literature.

EXAMPLE 5

Synthesis of n-butyl acrylate prepolymer from 2-iodo-2-phenylethanol

Figure 7:
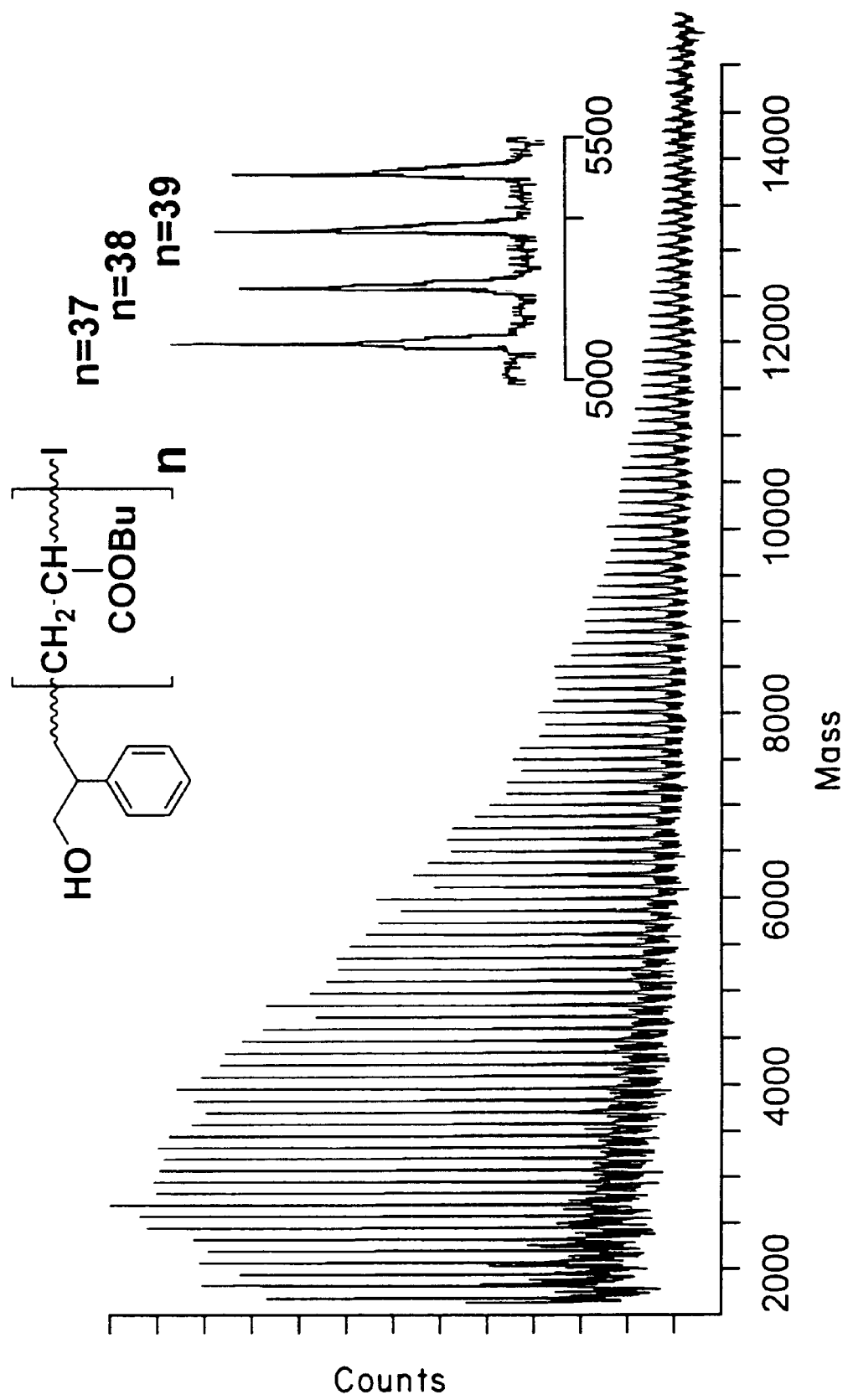
FIG. 7 illustrates the MALDI mass spectrum of the PIE prepolymer formed in Example 5.

A 500 ml reactor was charged with 150 ml of toluene, 150 grams n-butyl acrylate, 7.4 grams of the 2-iodo-2- phenylethanol formed in Example 1, 0.12 grams of AIBN and 5 ml of decane. The mixture was purged with argon for one hour and then heated to 70° C. After 400 minutes the monomer conversion was measured to be 85% and the reaction mixture was cooled to room temperature. The toluene was removed in vacuo and 150 ml of pentyl acetate were added and subsequently removed in vacuo. The resulting polymer was void of any residual monomer. NMR analysis showed both end groups ($CH_2OH$ and CHICOOR) and gave a number average molecular weight of 5160 g/mol. Based on the ratio of 1-iodo-1-phenylethanol to monomer, a theoretical molecular weight of 4,500 g/mol was expected. Elemental analysis yielded 3.3 wt. % iodine compared to 2.8 wt. % expected based on conversion of monomer. MALDI-TOF analysis showed the presence of only the expected polymer species (FIG. 7).

EXAMPLE 6

Synthesis of n-butyl acrylate prepolymer from 2-iodo-2-phenylethanol

A 100 ml reactor was charged with 29 grams toluene, 29 grams of n-butyl acrylate, 1.5 grams of the 2-iodo-2-phenylethanol formed in Example 1 and 0.246 gram of AIBN. The reaction was carried out as described in Example 5. Twenty-six grams of a viscous liquid were isolated. GPC analysis (using polystyrene standards) showed $M_n$ equal to 5130 g/mol and PDI equal to 2.27 (theoretical $M_n$ based on 1-iodo-1-phenylethanol to monomer was 4,500 g/mol). MALDI analysis showed the presence of only the expected polymer. No AIBN terminated species were observed.

EXAMPLE 7

Synthesis of n-butyl acrylate prepolymer using ethyl 2-iodopropionate

In a 50 ml reactor, 14.8 grams of n-butyl acrylate, 0.7 gram of ethyl 2-iodopropionate, 0.013 gram AIBN and 15 ml of toluene were mixed. By heating the mixture at 70° C. for 185 minutes, 88% of the monomer converted to polymer. GPC analysis showed an $M_n$ equal to 8140 g/mol and a PDI equal to 2.57 (theoretical $M_n$ was 3850 g/mol). MALDI analysis showed only one polymer species consistent with an ethyl propionate end group.

EXAMPLE 8

Synthesis of n-butyl acrylate prepolymer using iodoacetonitrile

A 50 ml reactor was charged with 15 grams of n-butyl acrylate, 0.34 gram of iodoacetonitrile, 15 ml of toluene, 0.025 gram of AIBN and 1 ml of decane. After heating the mixture at 65° C. for 4.45 hours, 95% of the monomer was converted. Evaporation of the reaction mixture yielded 10 grams of a polymer having $M_n$ equal to 12,100 g/mol and PDI equal to 2.56. MALDI analysis showed only the presence of acetonitrile initiated polymers.

EXAMPLE 9

Synthesis of n-butyl acrylate prepolymer using DIX

A 500 ml 3-neck flask was charged with 8.6 grams of DIX formed in Example 3, 120 ml toluene, 112.7 grams of n-butyl acrylate, 0.32 gram of AIBN and 8 ml of decane. The solution was purged with argon and then heated at 75° C. for 450 minutes at which point 95% of the monomer was converted. The $M_n$ was determined to be 2340 g/mol (theoretical $M_n$ equal to 2080) and the PDI was determined to be 2.71. NMR analysis showed that 17% of the benzylic iodide groups had not engaged in the reaction.

EXAMPLE 10

Synthesis of n-butyl acrylate prepolymer using DIX

A 500 ml, 4-necked round bottom flask was charged with 140 grams toluene, 140.0 grams n-butyl acrylate and 20 ml decane used as internal GC standard followed by the addition of 1.53 grams of AIBN and 33.40 grams DIX into the reactor. The solution was purged with argon for 30 minutes. The reaction was run at 70° C. for 5 hours and gas chromatographic analysis indicated that 85% monomer was converted. The solution was cooled to 0° C. with ice water and transferred to a 500 ml round-bottomed flask. Toluene was removed using a rotavap at 45–50° C./5 mm Hg followed by adding 150 ml pentyl acetate which was distilled at 45–50° C./10 mm Hg in order to remove butyl acrylate residuals. The same procedure using pentyl acetate was repeated four times until no n-butyl acrylate trace was detected by GC. The prepolymer was solvent-free and had a light yellowish color, which indicated that a trace amount of iodine was released from the prepolymer. Analysis by GPC (THF v. polystyrene standards) showed $M_n$ equal to 1450 g/mol and PDI equal to 1.58 ($M_n$ theoretical equal to 1570 g/mol). NMR showed the presence of the DIX fragment and iodine end groups in the correct ratios. MALDI-TOF analysis showed the presence of only the expected polymer species.

EXAMPLE 11

Synthesis of n-butyl acrylate prepolymer using allyliodide

N-butyl acrylate (15 grams), cyclohexane (15 ml), decane (1 ml), allyliodide (0.14 gram) and AIBN (0.034 gram) were heated at 70° C. in a 50 ml reactor for 12 hours. Monomer conversion by gas chromatography was 97%. The leftover solvent and monomer were removed in vacuo. Molecular weight analysis showed an $M_n$ equal to 22,800 g/mol ($M_n$ theoretical equal to 17,200 g/mol) and PDI equal to 2.69. NMR analysis showed the presence of the allyl end group.

EXAMPLE 12

Synthesis of styrene prepolymer using 2-iodo-2-phenylethanol

A 100 ml reactor was charged with 50 grams of styrene, 4.9 grams of 2-iodo-2-phenylethanol formed in Example 1, 17 ml of cyclohexane, 1 gram AIBN and 2 ml of decane. The reaction was heated at 70° C. overnight. The polymer was precipitated from THF in methanol to yield 31.6 grams of white powder. GPC analysis showed $M_n$ equal to 1580 g/mol and PDI equal to 1.47 ($M_n$ theoretical equal to 4400 g/mol). NMR and MALDI analysis showed the presence of the 1-iodo-1-phenylethanol and iodine end groups.

EXAMPLE 13

Synthesis of ethyl acrylate prepolymer using 2-iodo-2-phenylethanol

A mixture of 29.7 grams of ethyl acrylate, 1.49 grams of the 2-iodo-2-phenylethanol formed in Example 1, 30 ml of toluene, 0.027 gram of AIBN and 2 ml of decane was heated at 70° C. for 5.5 hours. Gas chromatographic analysis showed 87% monomer conversion. The solvent and residual monomer were removed by evaporation to yield 24.6 grams of a very viscous liquid. GPC in THF versus polystyrene standards showed an $M_n$ equal to 3500 g/mol and PDI equal to 2.97 ($M_n$ theoretical equal to 4400 g/mol). NMR analysis showed the presence of both end groups.

EXAMPLE 14

Synthesis of ethylhexyl acrylate prepolymer using 2-iodo-2-phenylethanol

In a 150 ml reaction flask were mixed 45 ml of ethylhexyl acrylate, 2.2 g of 2-iodo-2-phenylethanol, 50 ml of toluene and 0.04 gram of AIBN. The mixture was heated at 70° C. for 280 minutes at which point 77% monomer was converted. The toluene was removed under vacuo and the polymer was precipitated from a THF solution into methanol. The $M_n$ by GPC versus polystyrene standards was 5150 g/mol and PDI was equal to 2.35. NMR analysis showed both end groups and gave a molecular weight of 4400 g/mol (theoretical $M_n$ expected to be 3700 g/mol).

EXAMPLE 15

Synthesis of n-butyl acrylate prepolymer using DIX

A 250 ml, 4-necked round bottom flask was fitted with a mechanical agitator, argon inlet, condenser/gas bubbler and thermometer. Then, 40.0 ml toluene, 40.0 grams (44.74 ml) n-butyl acrylate and 5.5 ml decane used as internal GC standard were charged into the flask followed by adding 0.1642 gram AIBN and 3.5786 grams DIX into the reactor. The solution was purged with argon for 30 minutes. The flask was set in an oil bath at 70° C. The reaction was run at this temperature for 4 hours and GC result indicated that 74% monomer was converted. Another 0.0420 gram AIBN was added to get higher monomer conversion and the polymerization was continued at 70° C. for another hour until an 84% conversion was reached. The solution was cooled to 0° C. with ice water and transferred to a 250 ml round-bottomed flask. Toluene was removed using a rotavap equipment set-up at 25° C./10 mm Hg. Then 50 ml pentyl acetate was added and distilled at 50° C./10 mm HG in order to removed the residual butyl acrylate. The same procedure using pentyl acetate was repeated three times until no n-butyl acrylate was detected by GC.

EXAMPLE 16

Synthesis of n-butyl acrylate diol polymer

To a reaction mixture containing all of the prepolymer formed in Example 9 and 5% unreacted monomer were added 11.34 grams of mercaptoethanol and 10 grams CaO. The reaction was heated to 73° C. for 55 minutes at which point 55% of the mercaptoethanol had disappeared. The reaction mixture was diluted with 100 ml of toluene and filtered. The filtrate was vacuum dried at 50° C. overnight. The resulting polymer was dissolved in 1.5 L of ethanol and 1.5 L of water were added. The precipitate was recovered and reprecipitated. NMR analysis showed that all iodine groups had disappeared. The OH #(acetic anhydride method) was 17 (theoretically expected 23). Elemental analysis showed 1.03 wt. % S and 0.5 wt. % ash.

EXAMPLE 17

Synthesis of n-butyl acrylate diol polymer

Figure 9:
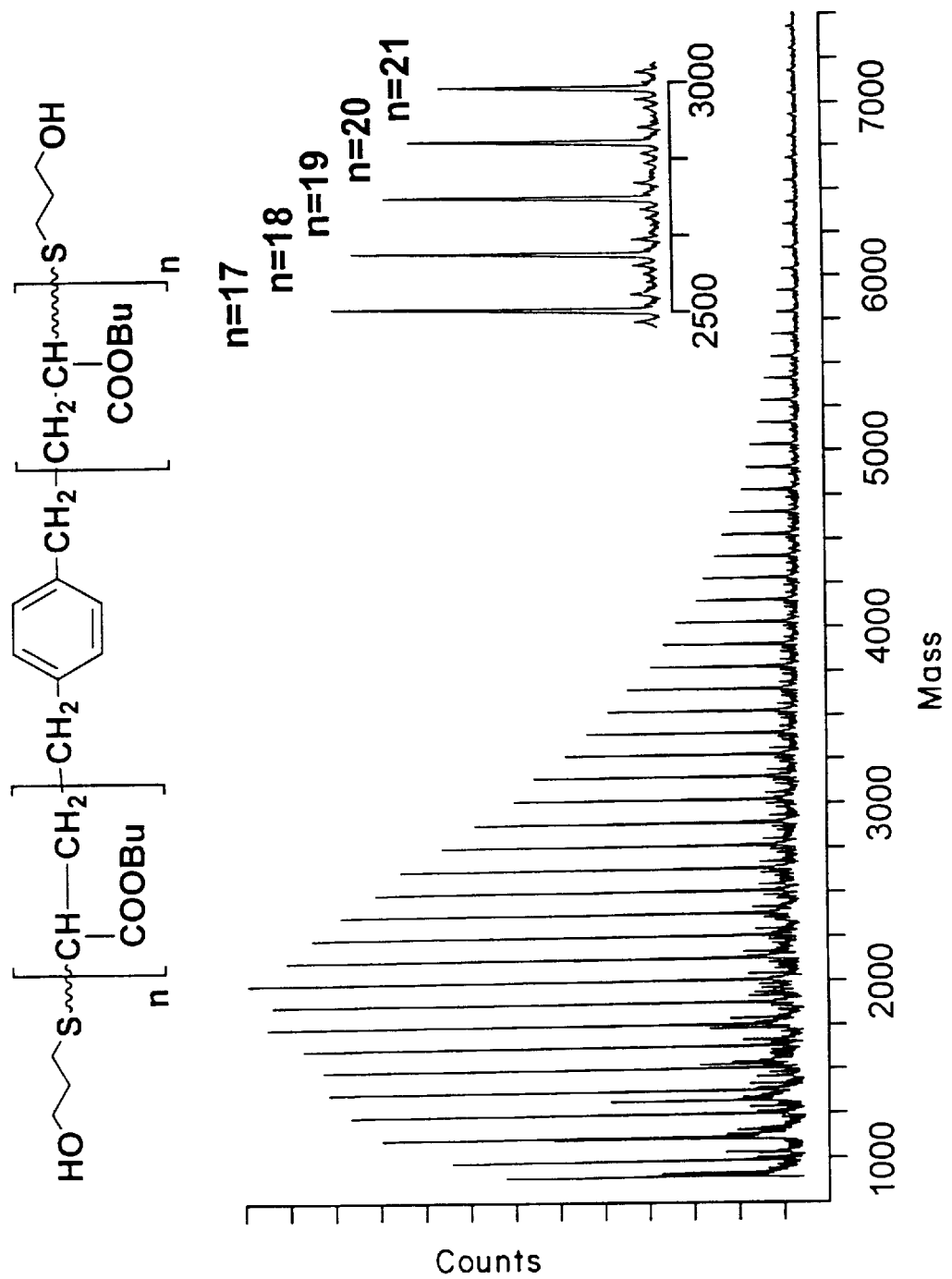
FIG. 9 illustrates the MALDI mass spectrum of the end-functionalized DIX polymer formed in Example 17.

All of the prepolymer formed in Example 10 was transferred into a 250 ml, 4-necked round bottom flask fitted with a mechanical agitator, argon inlet, condenser/gas bubbler and thermometer, followed by adding 30.0 ml DMF, 2.60 grams 3-mercapto-1-propanol and 3.90 grams potassium carbonate. The solution was stirred and purged with argon for 30 minutes. The functionalization reaction was carried out at 40° C. for 10 hours and a small amount of sample was taken out for NMR analysis. The reaction was stopped by lowering the reactor to room temperature. The salt was removed by separating the solid phrase from the solution by centrifuging at 6000 rpm for 15 minutes. The solution portion was transferred into a 250 ml flask to remove DMF at 45° C./5 mm Hg. Then, 50 ml cyclohexane was added into this flask and more salt was precipitated out from the solution and centrifuged out at 6000 rpm for 10 minutes to separate the salt from the solution. Cyclohexane was removed by distillation at R.T./20 mm Hg. OH# was 74.82. The conversion of the iodine end groups was complete by NMR analysis. MALDI analysis, as shown in FIG. 9, showed the presence of only one polymer species consistent with the expected diol product. The final product was a clear and low viscosity fluid.

EXAMPLE 18

Synthesis of n-butyl acrylate diol polymer

Figure 8:
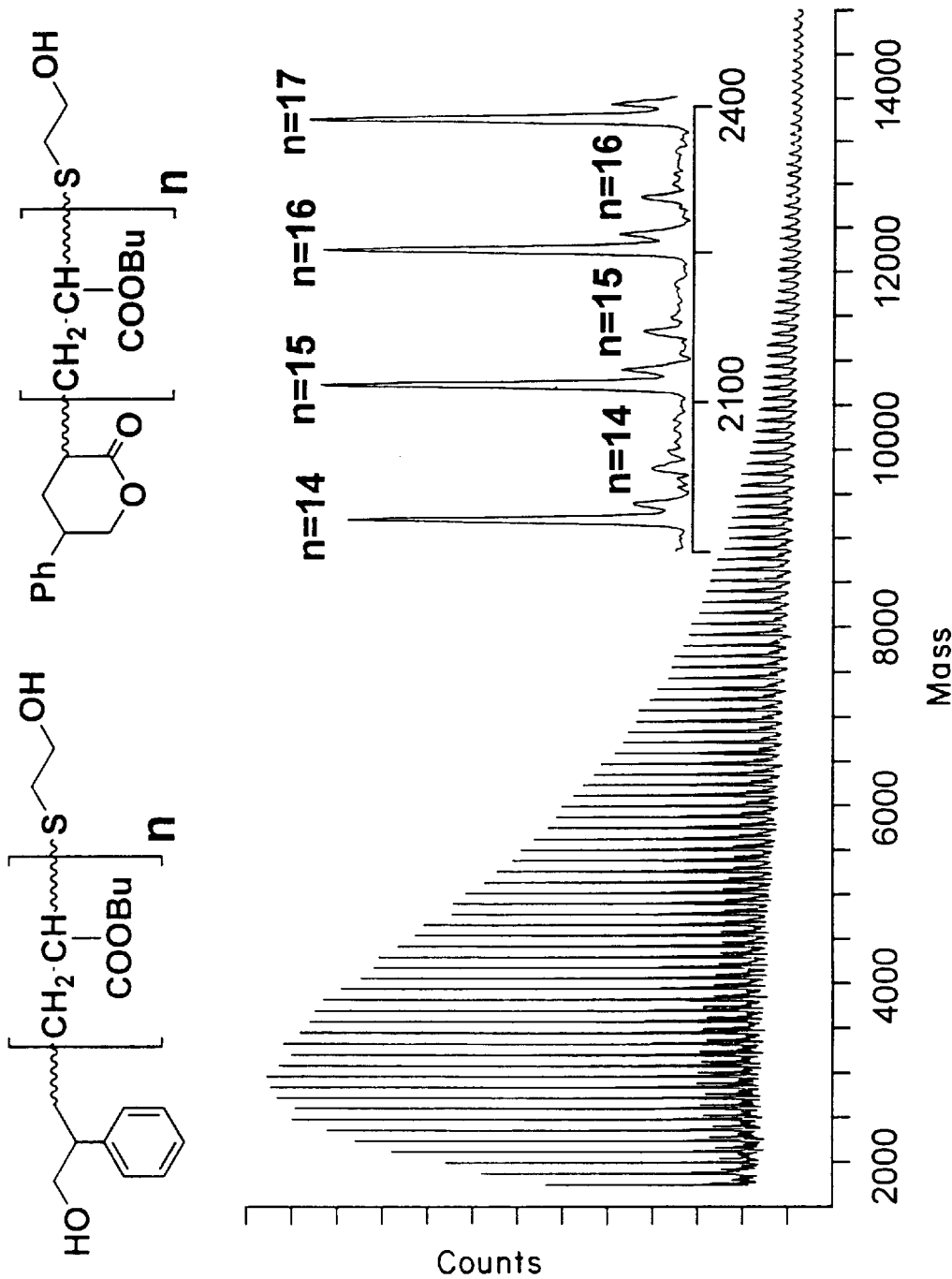
FIG. 8 illustrates the MALDI mass spectrum of the end-functionalized PIE polymer formed in Example 18.

The prepolymer formed in Example 5 (30 grams) and 1.08 grams of $K_2CO_3$ were dissolved in 60 ml of DMF. The reaction was purged with argon for 30 minutes to remove oxygen and 0.8 gram of mercaptoethanol were injected. The reaction was stirred at room temperature for 325 minutes and an additional 0.5 gram of $K_2CO_3$ and 0.23 gram of mercaptoethanol were added. After an additional 225 minutes, the reaction was filtered through a 1.2 micrometer filter. The DMF of the filtrate was removed in vacuo and 60 ml of toluene were added. The resulting solution was filtered again through a 1.2 micrometer filter and the toluene was removed in vacuo. The last step was repeated using a 0.45 micrometer filter. After removal of most the solvent, 31 grams of a very viscous oil was recovered. Analysis by NMR showed complete disappearance of the iodine end group of the starting material. Analysis using MALDI mass spectroscopy showed that the majority (greater than 90%) of the sample had the expected composition of the diol (see FIG. 8). The small impurity of this particular example showed the loss of butanol, presumably by chain end cyclization.

EXAMPLE 19

Synthesis of α-hydroxy-ω-carboxylic acid n-butyl acrylate) polymer

Fifteen grams of the 2-iodo-2-phenylethanol prepolymer formed in Example 5 were dissolved in 30 ml of dry DMF. Then, 2.2 grams $K_2CO_3$ and 0.75 gram of mercaptoacetic acid were added and the reaction was stirred at room temperature for 4 hours. The mixture was filtered over a 1.2 micrometer filter, the solvent was removed in vacuo and replaced with 60 ml of toluene. After the mixture was filtered and evaporated once again, 14 grams of a viscous liquid were obtained. NMR analysis show complete conversion of the iodine end groups and MALDI show incorporation of the acid into the polymer.

EXAMPLE 20

Synthesis of n-butyl acrylate diol polymer

All of the prepolymer of Example 15 was transferred into a 250 ml, 4-necked round bottom flask, which was fitted with the mechanical agitator, argon inlet, condenser/gas bubbler and thermometer, followed by adding 40.0 ml DMF, 2.211 grams 3-mercapto-1-propanol and 3.3170 grams potassium carbonate. The substitution reaction was carried out at 40° C. for 4 hours in small amounts and a small amount of sample was taken for NMR analysis. The substitution continued to run at this temperature for another 60 minutes and the reaction was then stopped by lowering the reactor to room temperature. The salt was removed by separating the solid phase from the solution by centrifuging at 6000 rpm for 15 minutes. The solution portion was transferred into a 250 ml flask to remove DMF at 80° C./10 mm Hg. Then, 40 ml toluene were added to the flask and more salt was precipitated out from the solution and centrifuged at 6000 rpm for 10 minutes to separate the salt from the solution. Toluene was removed by distillation at 45° C./10 mm Hg. This procedure was repeated three times.

EXAMPLE 21

Synthesis of n-butyl acrylate diol polymer

The bromine-terminated poly (n-butyl acrylate) prepolymer formed in Example 22 was displaced in a 100 ml round-bottom flask equipped with argon inlet. Fifty milliliters DMF were added and the mixture was stirred to form a solution. The solution was purged with nitrogen, followed by potassium carbonate (3.3 grams) and 3-mercapto-1-propanol were added. The mixture was stirred at 40° C. until all mercaptopropanol reacted, as evidenced by the GC analysis of the samples taken during the reaction. The mixture was then filtered and concentrated using a rotary evaporator. Sixty ml toluene were added to the flask and the mixture was filtered again to remove any remaining salt. This procedure was repeated, with toluene and decane solvents, until all inorganic salts were removed from the polymer. The solution was then concentrated and the polymer was then dried in a vacuum oven at 60° C. The resulting polyacrylate diol had a hydroxyl number of 53.46 and an $M_n$ of 2114.

EXAMPLE 22

Synthesis of n-butyl acrylate prepolymer via ATRP Process 100 ml 3 neck flask was charged with CuBr (1.89 grams) in a glove bag under positive argon pressure. The flask was capped with septa and removed from the glove bag. A reflux condenser with a argon gas inlet was attached and the flask was placed under a positive argon pressure. The liquid components, n-butyl acrylate (15 ml), toluene (15 ml) and decane (1 ml) were injected into the flask. α, α dibromo-p-xylene (1.73 grams) was weighed out and poured into the flask. The solid residue was wasted into the solution with 5 ml of toluene. Bipyridine (6.18 grams) was weighed out and poured into the flask. The residual solid was washed into the flask with the reaction liquor.

The solution was stirred rapidly (350 rpm) for five minutes to permit the CuBr $(BiPy)_2$ complex to form. The solution became a dark brown.

The flask was lowered into an oil bath at 95° C. to start the polymerization.

The reaction was run for five hours and then worked up by cooling and diluting with toluene (15 ml) and filtering through alumina to remove the solid catalyst residue. A cloudy, light brown liquid was recovered. The liquid was treated with activated carbon, cell filtered through a bed of celite. After evaporation of the solvent, 12.7 grams (84 wt. %) of a polymer were obtained.

EXAMPLE 23

Synthesis of polyurethane using polyacrylate diols

A mixture of 5.2 grams of the polyacrylate diol formed in Example 20, isophorone (5.2 grams), MDI (1.2 grams) and dibutyl tin dilaurate (200 ppm) was heated in a large test-tube for 1 hour at 70° C. Butanediol (0.1 gram) was added and the resulting solution was poured into a teflon pan and heated in an oven at 80° C. for 4 hours. The resulting polymer solution was poured into 250 grams of cyclohexane. The insoluble polyurethane was separated and dried under vacuum overnight. The polymer product was analyzed by GPC (Mw equal to 56,400 and polydispersity equal to 2.5).

EXAMPLE 24

Hydrolysis Resistance Testing of Polyurethanes

The polyurethane of Example 23 was exposed to an aqueous media for 72 hours at 95° C. The number average molecular weight of the sample, before and after exposure to the aqueous media, was determined by GPC and is recorded below in TABLE II. The percent molecular weight retained after each treatment corresponds to the hydrolysis resistance of the sample.

COMPARATIVE EXAMPLE 1

This example provides a comparison regarding end-functionalization with Nippon Shokubai Japanese patent application Kokai No. 4-132706.

A 100 ml, three-necked round bottom flask was fitted with a stirring bar, argon inlet, condenser/gas bubbler and thermometer. Then 16.1 grams (18.0 ml) n-butyl acrylate and 0.7200 grams DIX were charged into the flask. DIX was employed, instead of the DIT taught and used in the Nippon Shokubai patent application, because DIX is employed in the present invention and it was felt that the difference would not be considered material for the purposes of this comparison. The solution was purged with argon for 20 minutes. The flask was set in an oil bath at 60° C., polymerization was carried out at this temperature for 3 hours and then the reactor temperature was lowered to room temperature. Then 40 ml THF was added and the mixture was stirred until a homogeneous solution was obtained. Then, 1.3 ml 35% aqueous sodium hydroxide were added and the hydrolysis reaction was carried out at 60° C. for six hours. The solution was concentrated to give a colorless and viscous sample. The sample was washed three times with 50 ml DM water to remove sodium hydroxide and then was dried in the vacuum oven at 90° C. for 12 hours.

The $^1H$ NMR analysis indicated the presence of a significant amount of carboxyl groups and carbon-carbon double bonds in the resulting polyacrylate diol samples. Therefore, the hydrolysis of an iodo-functionalized polymer as taught by the Nippon Shokubai reference is not an efficient method for preparation of high functionality polyacrylate diols.

The invention has been described with reference to preferred and alternate embodiments. Obviously, modifications and alterations will occur to others upon the reading and understanding of this specification. The specification is intended to include all such modifications and alterations insofar as they come within the scope of the appended claims or the equivalents thereof.

What is claimed is:

1. A process for forming a polymer having a functional end group comprising heating a mixture of a functionalized iodine reagent containing a functional group selected from the group consisting of $OR_1$, $N(R_1)_2$, $SR_1$, $COOR_1$, $COOM$, an olefin of the type $-CR_1=C(R_1)_2$, an epoxide of the type

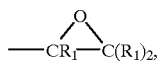

$SO_3M$, $PO(OR_1)_2$, $PO(R_1)_3$—$N=C=O$, and —$CR_1=O$, wherein $R_1$ is independently H or a group having 1 to 20 carbon atoms, and M represents a metal ion; a free radical initiator; and at least one polymerizable monomer, wherein the molar ratio of the free-radical initiator to said reagent being 10 to 0.001, and the molar ratio of said monomer to said reagent being 10 to 1000.

2. The process of claim 1 wherein the functionalized iodine reagent is selected from a compound of the formula

where R contains at least one radical stabilizing group and has 1–50 carbon atoms, the iodine and the radical stabilizing group are attached to the same carbon atom in R, and the radical stabilizing group is selected from the group consisting of an aryl, alkene, ester, acid, amide, ketone, nitrile, halogen, isocyanate, nitro and amine, and where $Z_2$ is selected from the group consisting of: $OR_1$, $N(R_1)_2$, $SR_1$, $COOR_1$, $COOM$, olefin of the type —$CR_1=C(R_1)_2$, an epoxide of the type

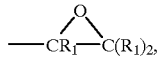

$SO_3M$, $PO(OR_1)_2$, $PO(R_1)_3$, $P(R_1)_3$, —$N=C=O$ and $CR_1=O$, wherein $R_1$ is equal to H or a group having 1–20 carbon atoms, $R_1$ being the same or different for any $Z_2$ having more than one $R_1$, and wherein M is a metal ion.

3. The process of claim 2 wherein the functionalized iodine reagent is selected from the group consisting of 2-iodo-2-phenylethanol, iodoacetic acid and allyl iodide.

4. The process of claim 1 wherein the free-radical initiator is an azo-initiator selected from the group consisting of azobisisobutyronitrile, azobiscyanovaleric acid, azobis (hydroxyethylcyanovaleramide), azobis (cyclohexanecarbonitrile), 2,2' azobis (4-methoxy-2,4-dimethylvaleronitrile), 2,2'-azobis[2-methyl-N-(2-hydroxyethyl)propionamide].

5. The process of claim 1 wherein the monomer is one selected from the group consisting of styrene and substituted derivatives thereof, conjugated dienes and substituted derivatives thereof, acrylates and substituted derivatives thereof, and mixtures thereof.

6. A process for forming a polymer having at least one functionalized end group, the process comprising the step of:
(a) heating a mixture of a functionalized iodine reagent, a free-radical initiator, and at least one polymerizable monomer to form a pre-polymer, the functionalized iodine reagent being of the formula

where R contains at least one radical stabilizing group and has 1–50 carbon atoms, the iodine and the radical stabilizing group are attached to the same carbon atom in R, and the radical stabilizing group is selected from the group consisting of an aryl, alkene, ester, acid, amide, ketone, nitrile, halogen, isocyanate, nitro and amine, and where $Z_2$ is selected from the group consisting of: $OR_1$, $N(R_1)_2$, $SR_1$, $COOR_1$, $COOM$, olefin of the type —$CR_1=C(R_1)_2$, epoxide of the type

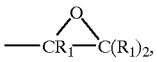

$SO_3M$, $PO(OR_1)_2$, $PO(R_1)_3$, $P(R_1)_3$, —$N=C=O$ and —$CR_1=O$, wherein $R_1$ is equal to H or a group having 1–20 carbon atoms, $R_1$ being the same or different for any $Z_2$ having more than one $R_1$, and wherein M is a metal ion.

7. The process of claim 6 further comprising the step of:
(b) functionalizing the pre-polymer by reaction with a nucleophilic reagent.

8. The process of claim 6 wherein the functionalized iodine reagent is one selected from the group consisting of 1-phenyl-1-iodoethanol, iodoacetic acid and allyl iodide.

9. The process of claim 6 wherein the free-radical initiator is one selected from the group consisting of peroxo compounds containing at least one O—O group.

10. The process of claim 6 wherein the free-radical initiator is one selected from the group consisting of azobisisobutyronitrile, azobiscyanovaleric acid, azobis (hydroxethylcyanovaleramide), azobis (cyclohexanecarbonitrile), 2.2' azobis (4-methoxy-2,4-dimethylvaleronitrile), 2.2'-azobis[2-methyl-N-(2-hydroxyethyl)propionamide].

11. The process of claim 6 wherein the monomer is one selected from the group consisting of styrene and substituted derivatives thereof, conjugated dienes and substituted derivatives thereof, acrylates and substituted derivatives thereof, and mixtures thereof.

12. The process of claim 7 wherein the nucleophilic reagent is one selected from the group consisting of mercaptoethanol, thioglycolic acid, mercaptopropanol, thiopropionic acid, allyl mercaptan, and mercaptoethylamine.

13. The process of claim 6 wherein the heating is conducted in a solvent or in bulk.

14. The process of claim 12 wherein the solvent is one selected from the group consisting of toluene, amyl acetate, butyl acetate, pseudocumene, tetrahydrofuran, and dimethylformamide.

15. The process of claim 13 wherein the solvent is toluene.

16. The process of claim 6 wherein the iodine reagent is preformed or formed in situ.

17. The process of claim 6 wherein the polymerizable monomer is added to the mixture simultaneously, sequentially, batchwise or metered.

18. The process of claim 6 wherein the monomer is selected from the group consisting of $C_3$–$C_6$ monoethylenically unsaturated carboxylic acids, and the alkaline metal and ammonium salts thereof.

19. The process of claim 18 wherein said monoethylenically unsaturated carboxylic acid include acrylic acid, methacrylic acid, crotonic acid, vinyl acetic acid, maleic acid, fumaric acid, and itaconic acid.

20. The process of claim 2 wherein the free-radical initiator is an azo-initiator selected from the group consisting of azobisisobutyronitrile, azobiscyanovaleric acid, azobis (hydroxyethylcyanovaleramide), azobis (cyclohexanecarbonitrile), 2,2' azobis (4-methoxy-2,4-dimethylvaleronitrile), 2,2'-azobis[2-methyl-N-(2-hydroxyethyl)propionamide].

21. The process of claim 2 wherein the monomer is one selected from the group consisting of styrene and substituted derivatives thereof, conjugated dienes and substituted derivatives thereof, acrylates and substituted derivatives thereof, and mixtures thereof.

* * * * *